United States Patent
Matsushita

(10) Patent No.: US 9,038,680 B2
(45) Date of Patent: May 26, 2015

(54) PNEUMATIC TIRE

(75) Inventor: Kohtaro Matsushita, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 932 days.

(21) Appl. No.: 13/226,081

(22) Filed: Sep. 6, 2011

(65) Prior Publication Data

US 2012/0261045 A1 Oct. 18, 2012

(30) Foreign Application Priority Data

Apr. 12, 2011 (JP) ................................ 2011-088167

(51) Int. Cl.
| | |
|---|---|
| *B60C 11/03* | (2006.01) |
| *B60C 11/04* | (2006.01) |
| *B60C 11/12* | (2006.01) |
| *B60C 11/13* | (2006.01) |

(52) U.S. Cl.
CPC ......... *B60C 11/1392* (2013.04); *B60C 11/0304* (2013.04); *B60C 2011/0341* (2013.04); *B60C 11/1236* (2013.04); *B60C 2011/0374* (2013.04)

(58) Field of Classification Search
CPC  B60C 11/03; B60C 11/04; B60C 2011/0304; B60C 2011/0341; B60C 2011/0344; B60C 2011/0346; B60C 2011/0348; B60C 2011/0351; B60C 2011/0353; B60C 2011/0355; B60C 2011/0374; B60C 2011/0376; B60C 2011/0379; B60C 2011/0386; B60C 2011/0388; B60C 11/1392; B60C 11/1236

USPC .............. 152/209.18, 209.27, 209.8, 209.13, 152/900, 901; D12/521, 553, 588
See application file for complete search history.

(56) References Cited

U.S. PATENT DOCUMENTS

| | | | | |
|---|---|---|---|---|
| 3,115,919 | A * | 12/1963 | Roberts .................... | 152/209.17 |
| 3,675,700 | A * | 7/1972 | Verdier .................... | 152/209.26 |
| 4,690,189 | A * | 9/1987 | Bradisse et al. ......... | 152/209.15 |
| 4,913,208 | A * | 4/1990 | Anderson et al. ........ | 152/209.18 |
| 2008/0196808 | A1* | 8/2008 | Ikeda et al. .............. | 152/209.24 |

FOREIGN PATENT DOCUMENTS

| | | | |
|---|---|---|---|
| JP | 2007-230251 | * | 9/2007 |
| JP | 2008-006987 A | | 1/2008 |

* cited by examiner

*Primary Examiner* — Eric Hug
(74) *Attorney, Agent, or Firm* — Global IP Counselors, LLP

(57) ABSTRACT

A pneumatic tire includes first and second side members at first and second sides and a tread section between the first and second side members. The tread section has a tread pattern including a pair of main grooves extending linearly in a circumferential direction of the tire and a land section extending in the circumferential direction between the main grooves. The land section includes a sub groove extending in the circumferential direction without connecting to the main grooves, and a first sipe connecting between the sub groove and one of the main grooves. The sub groove includes a first groove section extending diagonally toward the first side at 0 to 30 degrees with respect to the circumferential direction and a second groove section connecting to the first groove section and extending diagonally toward the second side at 10 to 45 degrees with respect to the circumferential direction.

18 Claims, 4 Drawing Sheets

PNEUMATIC TIRE

CROSS-REFERENCE TO RELATED APPLICATIONS

This application claims priority to Japanese Patent Application No. 2011-088167, filed on Apr. 12, 2011, the entire disclosure of which is hereby incorporated herein by reference.

BACKGROUND

1. Field of the Invention

The present invention relates to a pneumatic tire having a tread pattern. More particularly, the present invention relates to a pneumatic tire having improved resistance to uneven wear and improved performance in adverse conditions, such as snow.

2. Background Information

An all-season pneumatic tire for a passenger car is a tire developed as an intermediate tire between a normal tire for non-snowy seasons and a snow tire (i.e., a "winter tire"), and is widely used in the United States and Europe. An all-season pneumatic tire needs to have superior resistance to uneven wear while also ensuring sufficient traction performance and resistance to lateral slipping on snow during snowfall.

Japanese Laid Open Patent Application Publication No. 2008-006987 describes a known pneumatic tire having a tread section with a pair of crown longitudinal grooves that extend continuously and linearly in a circumferential direction of the tire on both sides of a tire equator and a center tread block formed between the crown circumferential grooves. The crown longitudinal grooves of this pneumatic tire comprise an inside crown longitudinal groove positioned toward an inside of the vehicle from the tire equator and an outside crown groove positioned toward an outside of the vehicle from the centerline when the tire is installed on a vehicle. A plurality of curved diagonal grooves are provided in the center land section such that they are spaced apart from one another in a circumferential direction of the tire. The curved diagonal grooves extend diagonally from the inside crown longitudinal groove toward the outside crown longitudinal groove and change direction at a position beyond the tire equator without reaching the outside crown longitudinal groove. After changing directions, the curved diagonal grooves extend beyond the tire equator toward the inside crown longitudinal groove. Curved diagonal grooves that are adjacent to each other along a circumferential direction of the tire have intersecting portions where they intersect each other at a position substantially on the tire equator.

SUMMARY

A tread pattern having curved diagonal grooves as described above can be unsuitable to use as a tread pattern of an all-season pneumatic tire for a passenger car because the tread pattern is not sufficiently resistant to uneven wear and may not provide sufficient traction performance on snow and thus, may not perform sufficiently well on snow.

Therefore, an object of the present invention is to provide a pneumatic tire that can improve a snow performance without decreasing resistance to uneven wear in comparison with the known pneumatic tire. With a pneumatic tire according to the present invention, a snow performance is improved without decreasing a resistance to uneven wear in comparison with the known pneumatic tire.

In view of the state of the known technology, a disclosed embodiment provides a pneumatic tire comprising a first side member disposed at a first side of the pneumatic tire, a second side member disposed at a second side of the pneumatic tire opposite to the first side in a widthwise direction of the pneumatic tire, and a tread section disposed between the first and second side members. The tread section has a tread pattern including a pair of circumferential main grooves and a land section. The circumferential main grooves extend linearly in a circumferential direction of the pneumatic tire. The land section extends in the circumferential direction of the pneumatic tire and is sandwiched between the pair of circumferential main grooves. The land section includes a sub groove and a first sipe. The sub groove extends in the circumferential direction of the pneumatic tire without connecting to the pair of circumferential main grooves, and the first sipe connects between the sub groove and a first one of the circumferential main grooves and is present in a portion of the land section that is between the sub groove and the second side of the pneumatic tire. The sub groove includes a first groove section and a second groove section. The first groove section extends diagonally toward the first side of the pneumatic tire at a first slant angle of 0 to 30 degrees with respect to the circumferential direction of the pneumatic tire. The second groove section connects to the first groove section so as to form a bend and extending diagonally toward the second side of the pneumatic tire at a second slant angle of 10 to 45 degrees with respect to the circumferential direction of the pneumatic tire, such that an absolute value of the second slant angle at which the second groove section extends with respect to the circumferential direction of the pneumatic tire is larger than an absolute value of the first slant angle at which the first groove section extends with respect to the circumferential direction of the pneumatic tire.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
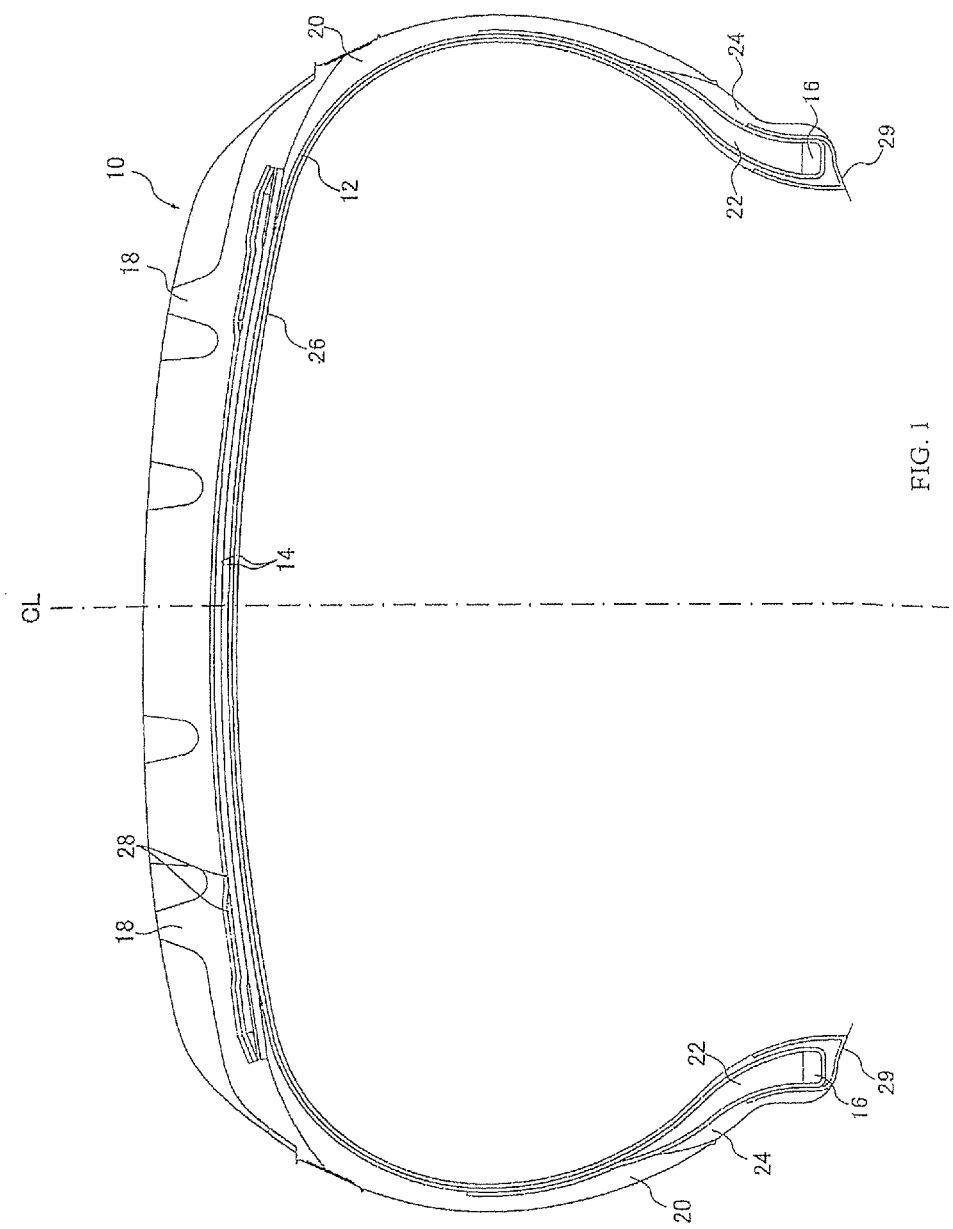
FIG. 1 is a cross sectional view of a pneumatic tire according to a disclosed embodiment.

A pneumatic tire according to a disclosed embodiment will now be described. FIG. 1 is a cross sectional view of a pneumatic tire 10 (also referred to simply as a "tire") according to an embodiment. The pneumatic tire 10 is, for example, a tire for a passenger car. A passenger car tire can be a tire defined according to Chapter A of the JATMA Yearbook 2009 (standards of The Japan Automobile Tyre Manufacturers Association, Inc.). The tire 10 can also be a small truck tire as defined in Chapter B or a truck tire or bus tire as defined in Chapter C, or a type of tire suitable with any other type of vehicle.

In the explanations that follow, a circumferential direction of a tire refers to a direction in which a tread surface rotates when the pneumatic tire 10 is rotated about a tire rotational axis, a radial direction of a tire is a direction extending perpendicularly to the tire rotational axis, and "outward in a radial direction" means away from the tire rotational axis along a radial direction of the tire. A widthwise direction of a tire means a direction parallel to the tire rotational axis, and "outward in a widthwise direction" of a tire means away from a tire centerline CL of the pneumatic tire 10 in either direction.

The pneumatic tire 10 comprises a carcass ply material 12, a belt member 14, and a bead core 16 serving as a framework material and a tread rubber member 18, a side rubber member 20, a bead filler rubber member 22, a rim cushion rubber member 24, and an inner liner rubber member 26 arranged around the framework material. The carcass ply material 12 is a member made of organic fibers covered with rubber. The organic fibers are wound between a pair of annular bead cores 16 in a toroidal form. Two belt members 14 are provided on a radially outward side of the carcass ply material. Each of the belt members 14 is made of steel cords that are arranged at a prescribed angle, e.g., 20 to 30 degrees, with respect to a circumferential direction of the tire and covered with rubber. The two belt members 14 are arranged layered over and under each other and the lower belt member 14 has a larger dimension in a widthwise direction of the tire than the upper belt member 14. The steel cords of the two layered belts 14 are arranged in opposing diagonal directions. Thus, the belt members 14 form crisscrossed layers that suppress expansion of the carcass ply material 12 caused by the pressure of the air with which the tire is inflated.

The tread rubber member 18 is provided on the radially outward side of the belt members 14 and the side rubber members 20 are connected to the edge portions of the tread rubber member 18 to form side sections. The rim cushion rubber members 24 are provided on radially inward edges of the side rubber members 20 and contact a wheel when the tire 10 is installed. The bead filler rubber members 22 are provided on radially outward sides of the bead cores 16 and arranged to be sandwiched between portions of the carcass ply material 12 reached before the carcass ply material 12 winds around the bead cores 16 and portions of the carcass ply material that are wound around the bead cores 16. The inner liner rubber member 26 is provided on an inner surface of the tire 10 facing a hollow space region that is surrounded by the tire 10 and the wheel and serves as a space into which air is filled. The pneumatic tire 10 also has a belt cover member 28 that comprises organic fibers coated with rubber and covers the belt members 14 on a radially outward side of the belt members 14 and a sheet member 29 that comprises organic fibers coated with rubber and covers the bead sections.

Figure 2:
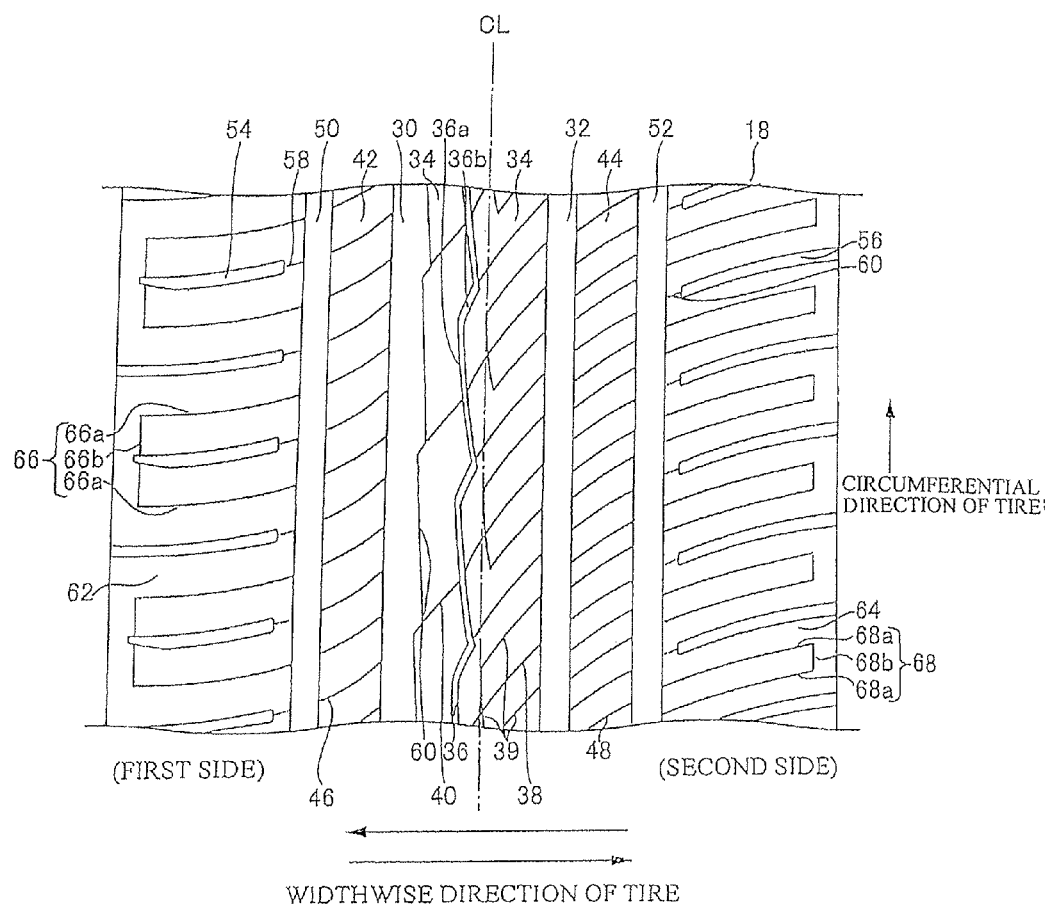
FIG. 2 is a flattened view showing a tread pattern of a tread section of the tire shown in FIG. 1 spread out in a flat plane.

FIG. 2 is a flattened view showing a tread pattern of a tread section 28 of the tire 10 shown in FIG. 1 spread out in a flat plane. The tread section 28 comprises inside circumferential grooves 30 and 32, a land section 34, a sub groove 36, sipes 38 and 40, land sections 42 and 44, sipes 46 and 48, outside circumferential grooves 50 and 52, shoulder lug grooves 54 and 56, sipes 58 and 60, and shoulder land sections 62 and 64. The tread pattern is asymmetrical with respect to the tire centerline CL and an installation direction of the tire is specified to be such that a first side, i.e., left-hand side in FIG. 2, is arranged facing outward from the vehicle and a second side, i.e., right-hand side in FIG. 2, is arranged facing inward toward the vehicle. Information regarding these specifications is indicated with a mark, a symbol, or lettering on, for example, a surface of a side portion of the tire 10.

The inside circumferential grooves 30 and 32 are configured to extend linearly in a circumferential direction and are arranged on opposite sides of the tire centerline CL. That is, the inside circumferential grooves 30 and 32 are arranged such that the tire centerline CL is positioned between the inside circumferential grooves 30 and 32.

Figure 3:
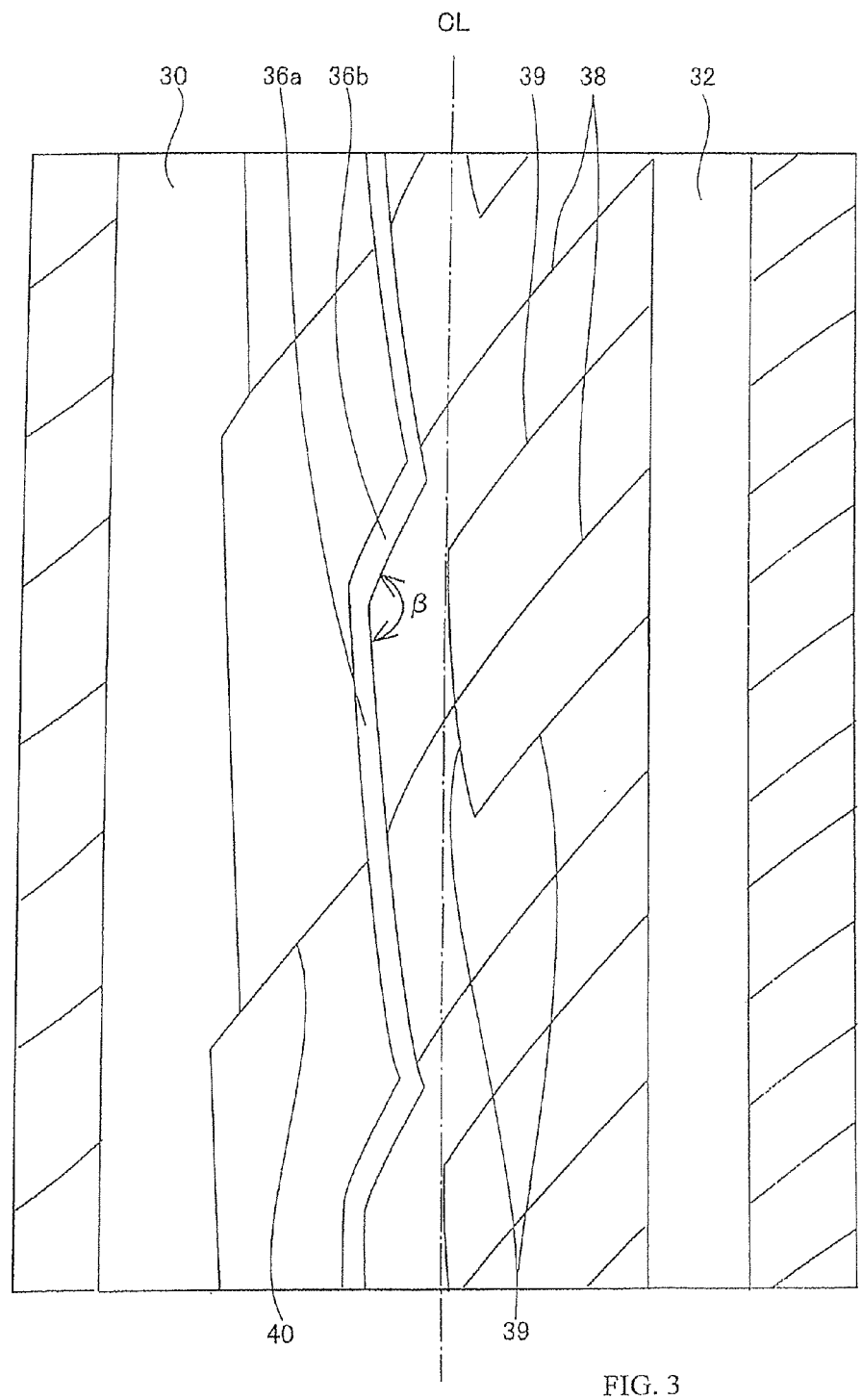
FIG. 3 is a enlarged partial view centered on a land section shown in FIG. 2

The land section 34 is a portion that lies between the pair of circumferential grooves 30 and 32 and serves as a portion of the tread rubber member 18 that extends in a circumferential direction of the tire and contacts the ground. FIG. 3 is an enlarged view centered on the land section 34. The sub groove 36 is provided in the land section 34 and extends generally in a circumferential direction of the tire without connecting to the pair of circumferential main grooves 30 and 32. The sub groove 36 includes first groove sections 36a and second groove sections 36b. The first groove sections 36a extend diagonally (slant) toward the left side (first side) of the tire from the perspective of FIG. 2 as one moves from bottom to top in FIG. 2. The slant angle of the first sections 36a is 0 to 30 degrees with respect to the circumferential direction of the tire.

The second groove sections 36b extend diagonally (slant) toward the right side (second side) of the tire from the perspective of FIG. 2 as one moves from bottom to top in FIG. 2 and connect to the first groove sections 36a so as to form bends. The slant angle of the second sections 36b is 10 to 45 degrees with respect to the circumferential direction of the tire. Additionally, regarding the diagonal state of the second groove sections 36b, an absolute value of the slant angle of the second groove sections 36b with respect to the circumferential direction of the tire is larger than an absolute value of the slant angle of the first groove sections 36a with respect to the circumferential direction of the tire. Thus, the first groove sections 36a are oriented closer to the circumferential direction of the tire than the second groove sections 36b. The first groove-sections 36a and the second groove sections 36b are basically provided on one side of the tire centerline CL, i.e., the left side (first side) when viewed as shown in FIG. 2, and the portions where the first groove sections 36a and the second groove sections 36b connect are arranged on the tire centerline CL or on the left side (first side) of the tire centerline CL when viewed as shown in FIG. 2. Thus, the first groove sections 36a and the second groove sections 36b do not extend across the tire centerline CL to the other side. Although in this embodiment the connecting portions of the first groove sections 36a and the second groove sections 36b are arranged on the tire centerline CL or on the first side, it is acceptable for the connecting portions to be on the second side. The second groove sections 36b (whose slant angle with respect to the circumferential direction of the tire is larger) are longer in the circumferential direction of the tire than the first groove sections 36a (whose slant angle with respect to the circumferential direction of the tire is smaller). A plurality of pairs comprising a first groove section 36a and a second groove section 36b are arranged in a continuous sequence along the circumferential direction of the tire.

Although in the example shown in FIG. 2 the first groove sections 36a and the second groove sections 36b are slightly curved into arcs, it acceptable for the groove sections to be linear. When the first groove sections 36a and second groove sections 36b configured to have an arced shape, the aforementioned slant angle means a slant angle of a tangent line at any given position along the groove sections. Thus, the statement that the absolute value of the slant angle of the second groove sections 36b is larger than the absolute value of the slant angle of the first groove sections 36a means that the minimum value among the absolute values of the slant angles of the second groove sections 36b is larger than a maximum value among the absolute values of the slant angles of the first groove sections 36a. Also, it is preferable for the first groove sections 36a and the second groove sections 36b to connect together at the connection portions with a bend angle β (see FIG. 3) of 100 to 160 degrees. If the bend angle β is smaller than the lower limit of the aforementioned range, i.e., smaller than 100 degrees, then the bends of the sub groove 36 will be large and a water drainage performance will decline, thereby degrading an anti-hydroplaning performance. If the bend angle β is larger than 160 degrees, then the sub groove 36 will approach the shape of a linear groove and an edge component oriented in the widthwise direction of the tire will be small, causing the traction performance and the performance on snow to decline.

The sipe (first sipes) 38 are provided in a region of the land section 34 located on the second side from the perspective of the sub groove 36 and are arranged to connect between the sub groove 36 and the inside circumferential groove 32 (first one of the circumferential main grooves). The sipes 38 are slanted toward the second side with respect to the circumferential direction of the tire as one moves from bottom to top in FIG. 2. Although in this embodiment the sipes 38 are slanted toward the second side with respect to the circumferential direction of the tire as one moves from bottom to top in FIG. 2, there are no particular limitations on the slant direction. However, in order to ensure good the performance on snow, it is preferable for the sipes 38 to be slanted toward the second side in the same direction as the second groove sections 36b, as is the case in this embodiment.

The land section 34 has sipes that extend from the connection portions of the first groove sections 36a and the second groove sections 36b and sipes 38 that extend from intermediate portions of the first groove sections 36a. Sipes 39 are also provided which extend from intermediate portions of the sipes 38 that extend from intermediate portions of the first groove sections 36a. The sipes 39 run in two directions, first extending from the sipes 38 parallel to the first groove sections 36a and then bending such that they run parallel to the sipes 38 and connect to the inside circumferential groove 32. The depths of the sipes 38 and 39 are, for example, 7 to 8 mm and similar to the depths of the inside circumferential grooves 30 and 32.

The sipes (second sipes) 40 are provided in a region of the land section 34 located on the first side from the perspective of the sub groove 36 and are arranged to connect between the sub groove 36 and the inside circumferential groove 30 (second one of the circumferential main grooves). The depth of the sipe 40, e.g., 3 to 5 mm, is shallower than the depth of the sipes 38 and 39. The sipes 40 slanted toward the second side with respect to the circumferential direction of the tire as one moves from bottom to top in FIG. 2, i.e., slanted in generally the same direction as the second groove sections 36b. The sipes 40 connect to the first groove sections 36a at positions near where the sipes 38 that extend from intermediate portions of the first groove sections 36a start. Although this embodiment has sipes 40, it is acceptable not to have sipes 40. However, from the perspective of increasing an edge component of the land section 34 in a widthwise direction of the tire and improving the performance on snow, it is preferable to provide sipes 40 that slant toward the second side in the same diagonal direction as the second groove sections 36b. The sipes 38, 39, and 40 are provided in the land section 34 in this way so that the edge component oriented in a widthwise direction of the tire can be increased and a performance on snow can be improved.

The inside circumferential grooves 30 and 32 have a groove width larger than 1.5 mm and preferably from 6.0 to 13.0 mm and a groove depth of at least 7 mm. The sub groove 36 has a groove width larger than 1.5 mm and preferably from 1.6 to 4.0 mm and a groove depth smaller than 7 mm. The sipes 38, 39, and 40 are groove-like formations having a width of 1.5 mm or smaller. The outside circumferential grooves that will be explained later are also assumed to have a groove width larger than 1.5 mm and preferably from 6.0 to 13.0 mm and a groove depth of at least 7 mm. Similarly, sipes that will be explained later are assumed to have a width of 1.5 mm or smaller. Since the sipes 38, 39, and 40 are configured such that the sipe width is 1.5 mm or smaller, the sipes 38, 39, and 40 close when they contact the ground and develop a compressive stress. In other words, the opposing wall surfaces of the sipes 38, 39, and 40 contact each other. Meanwhile, when a tensile stress or a shear stress occurs, the sipes 38, 39, and 40 open such that an edge component oriented in a widthwise direction of the tire is formed.

Figure 4:
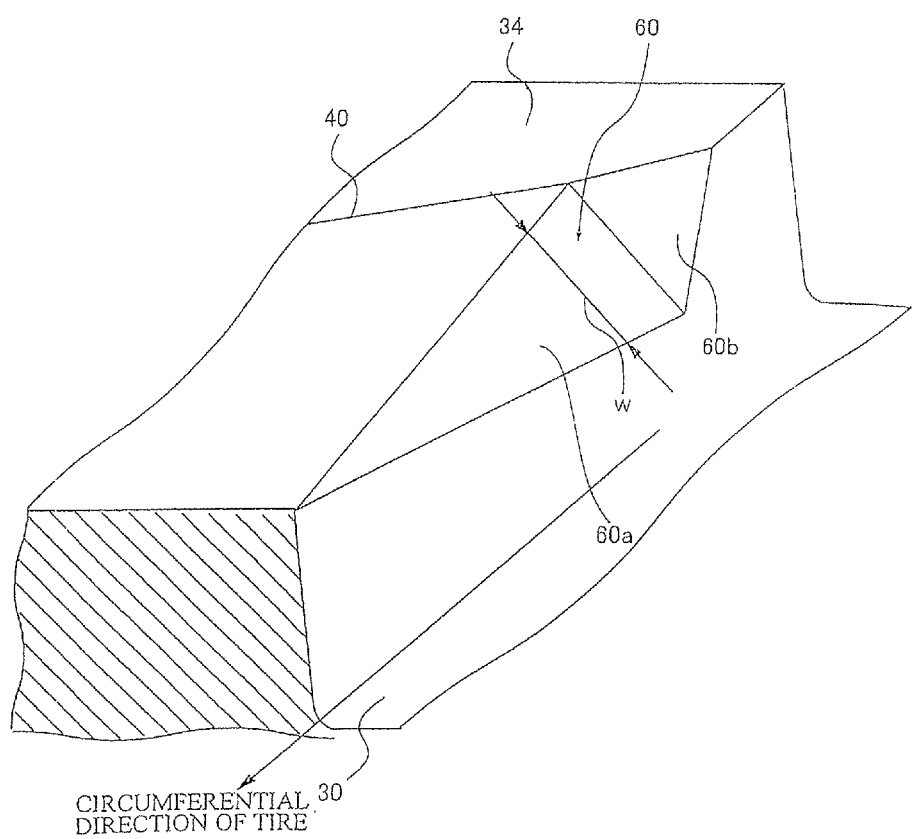
FIG. 4 illustrates a type of chamfering present in the disclosed embodiment.

Chamfers 60 are formed on portions where the land section 34 adjoins the inside circumferential groove 30. FIG. 4 illustrates a chamfer 60. A chamfer 60 is formed by cutting down an edge of the land section 34 that adjoins the inside circumferential groove 30 and extends in the circumferential direction of the tire at a surface of the land section 34 that contacts the ground. As shown in FIG. 3, the chamfers 60 are formed at regular intervals along the circumferential direction of the tire. As shown in FIG. 4, each of the chamfers 60 has a portion 60b along which a chamfer width W widens as one moves along the tire in a circumferential direction opposing a rotation direction and a portion 60a that follows the portion 60b in a continuous fashion and is configured such that its width W narrows as one moves along the circumferential direction opposing a rotation direction. A position along the circumferential direction of the tire that corresponds to where the width W of the chamfer 60 is largest is preferably offset from where a bent connection portion between a first groove section 36a and a second groove section 36b is positioned in the circumferential direction of the tire by an amount equal to at least 20% of a circumferential length of one chamfer 60. If the position where the chamfer width W of the chamfer 60 is largest is offset by an amount smaller than 20% of the circumferential length of the chamfer 60, then the connection portion and the position where the chamfer width W is largest will be exceedingly close and a rigidity of the tread rubber material 18 will decline in a localized manner in that region. Consequently, the tire easily becomes unevenly worn along the circumferential direction and a vibration and riding comfort performance will be degraded. The sipes 40 connect to the circumferential main groove 30 at positions along the circumferential direction of the tire that correspond to where the chamfer widths W of the chamfers 60 are largest. The chamfer width W varies along the circumferential direction of the tire and the chamfers 60 serve to increase an edge component of the land section 34 in a widthwise direction of the tire. Consequently, the chamfers 60 are effective at improving the performance of the tire on snow. Providing chamfers 60 on the land sections 34 can suppress an increase of contact pressure occurring at an edge portion of the land section 34 when the land section 34 contacts the ground and enables a more even contact pressure to be obtained, thereby enabling a steering stability to be improved when the tire 10 is installed on a vehicle. Although chamfers 60 are provided in this embodiment, it is acceptable not to provide chamfers 60. However, it is preferable to provided chamfers 60 from the standpoint of improving the performance on snow.

The outside circumferential main grooves 50 and 52 are arranged on the outsides of the inside circumferential main grooves 30 and 32 along a widthwise direction of the tire. An outside land section 42 is provided between the outside circumferential main groove 50 (second one of the outside circumferential grooves) and the inside circumferential main groove 30 (second one of the circumferential main grooves), and an outside land section 44 is provided between the outside circumferential main groove 52 (first one of the outside circumferential main grooves) and the inside circumferential main groove 32 (first one of the circumferential main grooves). The outside circumferential main grooves 50 and 52 to have, for example, a groove width of 6.0 to 13.0 mm and a groove depth of 7.0 to 12.0 mm. Sipes (third sipes) 46 and 48 are provided in the outside land sections 42 and 44, respectively, and configured to connect between the outside circumferential main grooves 50 and 52 and inside circumferential main grooves 30 and 32. The sipes 46 and 48 serve to increase an edge component in a widthwise direction of the tire and enable the performance on snow to be improved. Although the sipes 46 and 48 are slanted in the same direction as the second groove sections 36b with respect to the circumferential direction of the tire, they are closer to the widthwise direction of the tire than the sipes 38, 39, and 40. As shown in FIG. 2, the number of sipes 48 is larger than the number of sipes 46 and, thus, the land section 44 has more edge component in the widthwise direction of the tire.

Shoulder land sections 62 and 64 are provided in position located outwardly from the outside circumferential grooves 50 and 52 in a widthwise direction of the tire and span to an end of the tread pattern. Shoulder lug grooves 54 and 56 are formed in the shoulder land sections 62 and 64 and configured to curve such that they assume an orientation closer to the widthwise direction of the tire as they approach the widthwise outsides of the tire. The shoulder lug grooves 54 and 56 close off at an intermediate position and do not connect to the outside circumferential grooves 50 and 52. Sipes (fourth sipes) 58 and 60 are provided which connect between the outside circumferential grooves 50 and 52 and the closed off ends of the shoulder lug grooves 54 and 56 on the respective sides of the tire. The shoulder grooves 54 and 56 slant in the same direction as the second groove sections 36b with respect to the circumferential direction of the tire (i.e., toward the second side). The shoulder lug grooves 54 and 56 each have, for example, a groove width of 2.5 to 4.0 mm and a maximum groove depth of 5.0 to 11.0 mm. The groove depth gradually decreases as one proceeds toward the pattern end. The shoulder lug grooves 54 end before they reach the pattern end. Meanwhile, the shoulder lug grooves 56 extend to the pattern end.

Sipes 66 are also provided in the shoulder land section 62. The sipes 66 comprise sipe elements 66a and sipe elements 66b. The sipe elements 66a are arranged to sandwich each of the shoulder lug grooves 54 along the circumferential direction of the tire and to extend from the outside circumferential groove 50 in a widthwise outwardly direction of the tire parallel to the shoulder lug grooves 54. The sipe elements 66b extend along the circumferential direction of the tire so as to cut across a position corresponding to a shoulder-side end portion where the shoulder lug groove 54 ends on a widthwise outer side of the tire. Sipes 68 are also provided in the shoulder land section 61. Each of the sipes 68 comprises two sipe elements 68a and a sipe element 66b arranged in a region sandwiched between two adjacent shoulder lug grooves 56 along the circumferential direction of the tire. The two sipe elements 68a extend from the outside circumferential groove 52 for a prescribed distance in a widthwise outwardly direction of the tire parallel to the shoulder lug groove 56. The sipe element 68b extends along the circumferential direction of the tire so as to join the end portions of the two sipe elements 68a. The shoulder lug grooves 54 and 56 and the sipes 66 and 68 enable an edge component oriented in a widthwise direction of the tire to be increased in the shoulder land regions 62 and 64 and a performance on snow to be improved.

From the standpoint of improving a wear resistance of the tread pattern according this embodiment shown in FIG. 2, a groove surface area ratio of the tread pattern (ratio of area occupied by grooves with respect to a surface area that contacts the ground) is preferably 25 to 35%, or more preferably 25 to 33%. The groove widths of the inside circumferential grooves 30 and 32, the outside circumferential grooves 50 and 52, and the shoulder lugs 54 and 56 can be adjusted in order to obtain such a groove surface area ratio.

A tread pattern like that of the tire 10 has various types of grooves, including four circumferential grooves and a sub groove 36 provided in the land section 34. As a result, the groove surface area ratio can be curbed to a low ratio as explained previously and a wear resistance can be improved. By providing multiple sipes in the land section 34, an edge component oriented in a widthwise direction of the tire can be increased in the land section 34 and a performance on snow (including snow traction performance) can be improved.

In order to investigate the effects of a pneumatic tire according to the disclosed embodiment, pneumatic tires having the same tire structure and tire cross sectional profile were fabricated with various tread patterns and installed onto a vehicle to evaluate the anti-wear performance and the performance on snow. The size of the pneumatic tires used was 215/60R16. The vehicle used in the evaluation was a four-door sedan having an engine displacement of 2.0 liters and a rim size of 16×6.5 J. The tires were inflated to a pressure of 220 kPa and a load born by the tires was set to 88% of a maximum load stipulated by JATMA. The anti-wear performance was evaluated by measuring an amount of wear of the pneumatic tire after traveling 20,000 km, calculating a wear life based on the result of the wear amount measurement, and converting the wear life into an index defined to have a value of 100 when used with respect to a wear life of a prior art example. The higher the value of the index is, the longer the wear life is that it indicates. Also, the performance on snow was evaluated using a sensory evaluation performed by a driver driving through a test course having on snow at an average speed of 50 km/hour. The sensory evaluations were performed comparatively assuming the prior art example has an evaluation point value of 100. A higher number of evaluation points indicates a better performance on snow.

The tread pattern of the prior art example is configured such that a groove corresponding to the sub groove 36 shown in FIG. 2 is straight instead of bent, i.e., it extends linearly along a circumferential direction of the tire. Also, instead of sipes 38 and 40, the prior art example has a lug groove with a groove width of 3.0 mm. In working examples 1 to 8, the tread pattern is based on the tread pattern shown in FIG. 2, and the sub groove 36 and the sipes (first sipes) 38 are maintained as is. Meanwhile, the bend angle β at the connection portions between the first groove sections 36a and the section groove sections 36b and the distance in a circumferential direction of the tire between the position (bend position) of a connection portion between a first groove section 36a and a second groove section 36b and the position where a chamfer width W of a chamfer 60 is largest are varied. The aforementioned distance is expressed in terms of a ratio (%) obtained by dividing the aforementioned distance by the length of one chamfer 60 in the circumferential direction of the tire. Comparative examples 1 to 3 are examples in which at least one of the characteristic of the sub groove 36 being bent and the characteristic of sipes (first sipes) 38 being provided is omitted. Table 1 below shows specifications of the tread patterns and evaluation results.

TABLE 1

|  | Prior Art Example | Working Example 1 | Working Example 2 | Working Example 3 | Working Example 4 | Working Example 5 | Working Example 6 | Working Example 7 | Working Example 8 | Comparative Example | Comparative Example | Comparative Example |
|---|---|---|---|---|---|---|---|---|---|---|---|---|
| Sub groove shape | None (linear shape) | Bent shape | ← | ← | ← | ← | ← | ← | ← | Linear shape | Linear shape | Bent shape |
| First sipe or lug groove | Lug groove | First sipe | ← | ← | ← | ← | ← | ← | ← | Lug groove | First sipe | Lug groove |
| Chamfer provided | No | No | Yes | No | ← | Yes | ← | ← | No | None | ← | ← |
| β (degrees) | — | 100 degrees | 100 degrees | 160 degrees | 170 degrees | 160 degrees | ← | ← | 95 degrees | — | — | 100 degrees |
| Distance between bend position and position of maximum chamfer width | — | — | 30% | — | — | 30% | 20% | 15% | — | — | — | — |
| Snow performance | 100 | 103 | 105 | 103 | 103 | 103 | 103 | 103 | 105 | 100 | 95 | 103 |
| Anti-wear performance | 100 | 110 | 110 | 103 | 100 | 110 | 105 | 100 | 100 | 100 | 110 | 90 |

Based on the results of the Working Example 1 and Comparative Examples 1 to 3 shown in Table 1, it is apparent that the performance on snow and the anti-wear performance improve with Working Example 1. The results show that the bent shape of the sub groove 36 and the existence of the sipes (first sipes) 38 are necessary to improve the performance on snow and the anti-wear performance. Also, a comparison of the results obtained for Working Examples 1 and 2 indicates that providing chamfers 60 is preferable from the standpoint of improving the performance on snow and the anti-wear performance. A comparison of Working Examples 1, 3, 4, and 8 indicates that having the bend angle β in the range of 100 to 160 degrees does not cause the resistance to uneven wear to decline and is preferable from the standpoint of improving the performance on snow. A comparison of the Working Examples 5, 6, and 7 indicates that it is preferable for the distance (%) to be 20% or smaller from the standpoint of improving the performance on snow and the anti-wear performance. Thus, it is clear that a pneumatic tire according to the present invention is effective.

Although a pneumatic tire according to the present invention has been explained in detail, the present invention is not limited to the previously explained embodiment and various improvements and modifications can clearly be made without departing from the scope of the invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
    a first side member disposed at a first side of the pneumatic tire and a second side member disposed at a second side of the pneumatic tire opposite to the first side in a widthwise direction of the pneumatic tire; and
    a tread section disposed between the first and second side members, the tread section having a tread pattern including a pair of circumferential main grooves and a land section;
    the pair of circumferential main grooves extending linearly in a circumferential direction of the pneumatic tire;
    the land section extending in the circumferential direction of the pneumatic tire and being sandwiched between the pair of circumferential main grooves, the land section including a sub groove and a first sipe, the sub groove extending in the circumferential direction of the pneumatic tire without connecting to the pair of circumferential main grooves, and the first sipe connecting between the sub groove and a first one of the circumferential main grooves and being present in a portion of the land section that is between the sub groove and the second side of the pneumatic tire;
    the sub groove including a first groove section and a second groove section, the first groove section extending diagonally toward the first side of the pneumatic tire at a first slant angle of 0 to 30 degrees with respect to the circumferential direction of the pneumatic tire, and the second groove section connecting to the first groove section so as to form a bend and extending diagonally toward the second side of the pneumatic tire at a second slant angle of 10 to 45 degrees with respect to the circumferential direction of the pneumatic tire, such that an absolute value of the second slant angle at which the second groove section extends with respect to the circumferential direction of the pneumatic tire is larger than an absolute value of the first slant angle at which the first groove section extends with respect to the circumferential direction of the pneumatic tire;

an edge of the land section located where the land section adjoins a second one of the circumferential main grooves including chamfers disposed at regular intervals along the circumferential direction of the pneumatic tire, each of the chamfers including a portion where a width of the chamfer widens along the circumferential direction of the pneumatic tire opposing a rotation direction of the pneumatic tire and a portion where the width of the chamfer narrows along the circumferential direction opposing the rotation direction; and a position along the circumferential direction of the pneumatic tire that corresponds to a location where the width of the chamfer is largest being offset by an amount equal to at least 20% of a circumferential length of the chamfer from a position along the circumferential direction of the pneumatic tire that corresponds to a location where the first groove section and the second groove section connect to each other.

2. The pneumatic tire according to claim 1, wherein the first sipe extends diagonally toward the second side of the pneumatic tire toward which the second groove section extends with respect to the circumferential direction of the pneumatic tire.

3. The pneumatic tire according to claim 1, wherein a portion of the land section that is between the sub groove and the first side of the pneumatic tire includes a second sipe, the second sipe being configured to connect the sub groove to a second one of the circumferential main grooves, and the second sipe being slanted diagonally toward the second side of the pneumatic tire toward which the second groove section is slanted with respect to the circumferential direction of the pneumatic tire.

4. The pneumatic tire according to claim 1, wherein the first groove section and the second groove section connect at a connection portion, the connection portion having a bend angle from 100 to 160 degrees.

5. The pneumatic tire according to claim 1, wherein the circumferential main grooves are located in the tread section such that a pneumatic tire centerline is positioned between the circumferential main grooves.

6. The pneumatic tire according to claim 1, wherein the tread section further includes
a pair of outside circumferential grooves, a first one of the outside circumferential grooves being positioned between the first one of the circumferential main grooves and the second side of the pneumatic tire and a second one of the outside circumferential grooves being positioned between a second one of the circumferential main grooves and the first side of the pneumatic tire; and
outside land sections provided between the first one of the outside circumferential grooves and the first one of the circumferential main grooves and between the second one of the outside circumferential grooves and the second one of the circumferential main grooves, each of the outside land sections including a third sipe, configured such that the third sipe in each of the outside land sections that are provided between the first one of the outside circumferential grooves and the first one of the circumferential main grooves connects between the first one of the outside circumferential grooves and the first one of the circumferential main grooves and the third sipe in each of the outside land sections that are provided between the second one of the outside circumferential grooves and the second one of the circumferential main grooves connects between the second one of the outside circumferential grooves and the second one of the circumferential main grooves.

7. The pneumatic tire according to claim 6, wherein each of the third sipes is slanted diagonally toward the second side of the pneumatic tire toward which the second groove section is slanted with respect to the circumferential direction of the pneumatic tire.

8. The pneumatic tire according to claim 1, wherein the pneumatic tire is installed on a vehicle such that the first side of the pneumatic tire faces outward from the vehicle and the second side of the pneumatic tire faces inward toward the vehicle.

9. The pneumatic tire according to claim 2, wherein a portion of the land section that is between the sub groove and the first side of the pneumatic tire includes a second sipe, the second sipe being configured to connect the sub groove to a second one of the circumferential main grooves, and the second sipe being slanted diagonally toward the second side of the pneumatic tire toward which the second groove section is slanted with respect to the circumferential direction of the pneumatic tire.

10. The pneumatic tire according to claim 2, wherein an edge of the land section located where the land section adjoins a second one of the circumferential main grooves includes chamfers disposed at regular intervals along the circumferential direction of the pneumatic tire, each of the chamfers including a portion where a width of the chamfer widens along the circumferential direction of the pneumatic tire opposing a rotation direction of the pneumatic tire and a portion where the width of the chamfer narrows along the circumferential direction opposing the rotation direction.

11. The pneumatic tire according to claim 3, wherein an edge of the land section located where the land section adjoins a second one of the circumferential main grooves includes chamfers disposed at regular intervals along the circumferential direction of the pneumatic tire, each of the chamfers including a portion where a width of the chamfer widens along the circumferential direction of the pneumatic tire opposing a rotation direction of the pneumatic tire and a portion where the width of the chamfer narrows along the circumferential direction opposing the rotation direction.

12. The pneumatic tire according to claim 3, wherein the tread section further includes
a pair of outside circumferential grooves, a first one of the outside circumferential grooves being positioned between the first one of the circumferential main grooves and the second side of the pneumatic tire and a second one of the outside circumferential grooves being positioned between a second one of the circumferential main grooves and the first side of the pneumatic tire; and
outside land sections provided between the first one of the outside circumferential grooves and the first one of the circumferential main grooves and between the second one of the outside circumferential grooves and the second one of the circumferential main grooves, each of the outside land sections including a third sipe, configured such that the third sipe in each of the outside land sections that are provided between the first one of the outside circumferential grooves and the first one of the circumferential main grooves connects between the first one of the outside circumferential grooves and the first one of the circumferential main grooves and the third sipe in each of the outside land sections that are provided between the second one of the outside circumferential grooves and the second one of the circumferential main grooves connects between the second one of the outside circumferential grooves and the second one of the circumferential main grooves.

13. The pneumatic tire according to claim 12, wherein the tread section further includes
shoulder land sections positioned between the first one of the outside circumferential grooves and the second side of the pneumatic tire and between the second one of the outside circumferential grooves and the first side of the pneumatic tire, each of the shoulder land sections including a shoulder lug groove and a fourth sipe, the shoulder lug groove being configured to curve to assume an extension orientation closer to the widthwise direction of the pneumatic tire as the shoulder lug groove approaches a widthwise outside location of the pneumatic tire, and the shoulder lug groove being further configured to close off at an intermediate position without connecting to a respective one of the first and second outside circumferential grooves, and the fourth sipe being configured to connect between the respective one of the first and second outside circumferential grooves and the closed off end of the shoulder lug groove.

14. The pneumatic tire according to claim 13, wherein each of the shoulder land sections includes fifth sipes, each of the fifth sipes comprising first sipe elements and a second sipe element, the first sipe elements being arranged to sandwich one of the shoulder lug grooves along the circumferential direction of the pneumatic tire and to extend from the respective one of the outside circumferential grooves in a widthwise outwardly direction of the pneumatic tire, and the second sipe element being arranged to extend along the circumferential direction of the pneumatic tire to connect to the first sipe elements and cut across a position corresponding to a shoulder-side end portion where the shoulder lug groove ends on a widthwise outward side of the pneumatic tire.

15. A pneumatic tire comprising:
a first side member disposed at a first side of the pneumatic tire and a second side member disposed at a second side of the pneumatic tire opposite to the first side in a widthwise direction of the pneumatic tire; and
a tread section disposed between the first and second side members, the tread section having a tread pattern including a pair of circumferential main grooves and a land section;
the pair of circumferential main grooves extending linearly in a circumferential direction of the pneumatic tire;
the land section extending in the circumferential direction of the pneumatic tire and being sandwiched between the pair of circumferential main grooves, the land section including a sub groove and a first sipe, the sub groove extending in the circumferential direction of the pneumatic tire without connecting to the pair of circumferential main grooves, and the first sipe connecting between the sub groove and a first one of the circumferential main grooves and being present in a portion of the land section that is between the sub groove and the second side of the pneumatic tire;

the sub groove including a first groove section and a second groove section, the first groove section extending diagonally toward the first side of the pneumatic tire at a first slant angle of 0 to 30 degrees with respect to the circumferential direction of the pneumatic tire, and the second groove section connecting to the first groove section so as to form a bend and extending diagonally toward the second side of the pneumatic tire at a second slant angle of 10 to 45 degrees with respect to the circumferential direction of the pneumatic tire, such that an absolute value of the second slant angle at which the second groove section extends with respect to the circumferential direction of the pneumatic tire is larger than an absolute value of the first slant angle at which the first groove section extends with respect to the circumferential direction of the pneumatic tire;
an edge of the land section located where the land section adjoins a second one of the circumferential main grooves including chamfers disposed at regular intervals along the circumferential direction of the pneumatic tire, each of the chamfers including a portion where a width of the chamfer widens along the circumferential direction of the pneumatic tire opposing a rotation direction of the pneumatic tire and a portion where the width of the chamfer narrows along the circumferential direction opposing the rotation direction; and
a portion of the land section that is between the sub groove and the first side of the pneumatic tire including a second sipe, the second sipe being configured to connect the sub groove to a second one of the circumferential main grooves, the second sipe being slanted diagonally toward the second side of the pneumatic tire toward which the second groove section is slanted with respect to the circumferential direction of the pneumatic tire, and the second sipe connecting to the second one of the circumferential main grooves at a position along the circumferential direction of the pneumatic tire corresponding to a location where the width of the chamfer is largest.

16. A pneumatic tire comprising:
a first side member disposed at a first side of the pneumatic tire and a second side member disposed at a second side of the pneumatic tire opposite to the first side in a widthwise direction of the pneumatic tire; and
a tread section disposed between the first and second side members, the tread section having a tread pattern including a pair of circumferential main grooves and a land section;
the pair of circumferential main grooves extending linearly in a circumferential direction of the pneumatic tire;
the land section extending in the circumferential direction of the pneumatic tire and being sandwiched between the pair of circumferential main grooves, the land section including a sub groove and a first sipe, the sub groove extending in the circumferential direction of the pneumatic tire without connecting to the pair of circumferential main grooves, and the first sipe connecting between the sub groove and a first one of the circumferential main grooves and being present in a portion of the land section that is between the sub groove and the second side of the pneumatic tire;
the sub groove including a first groove section and a second groove section, the first groove section extending diagonally toward the first side of the pneumatic tire at a first slant angle of 0 to 30 degrees with respect to the circumferential direction of the pneumatic tire, and the second groove section connecting to the first groove section so as to form a bend and extending diagonally toward the second side of the pneumatic tire at a second slant angle of 10 to 45 degrees with respect to the circumferential direction of the pneumatic tire, such that an absolute value of the second slant angle at which the second groove section extends with respect to the circumferential direction of the pneumatic tire is larger than an absolute value of the first slant angle at which the first groove section extends with respect to the circumferential direction of the pneumatic tire;

the tread section further comprising:
  a pair of outside circumferential grooves, a first one of the outside circumferential grooves being positioned between the first one of the circumferential main grooves and the second side of the pneumatic tire and a second one of the outside circumferential grooves being positioned between a second one of the circumferential main grooves and the first side of the pneumatic tire;
  outside land sections provided between the first one of the outside circumferential grooves and the first one of the circumferential main grooves and between the second one of the outside circumferential grooves and the second one of the circumferential main grooves, each of the outside land sections including a third sipe, configured such that the third sipe in each of the outside land sections that are provided between the first one of the outside circumferential grooves and the first one of the circumferential main grooves connects between the first one of the outside circumferential grooves and the first one of the circumferential main grooves and the third sipe in each of the outside land sections that are provided between the second one of the outside circumferential grooves and the second one of the circumferential main grooves connects between the second one of the outside circumferential grooves and the second one of the circumferential main grooves; and
  shoulder land sections positioned between the first one of the outside circumferential grooves and the second side of the pneumatic tire and between the second one of the outside circumferential grooves and the first side of the pneumatic tire, each of the shoulder land sections including a shoulder lug groove and a fourth sipe, the shoulder lug groove being configured to curve to assume an extension orientation closer to the widthwise direction of the pneumatic tire as the shoulder lug groove approaches a widthwise outside location of the pneumatic tire, and the shoulder lug groove being further configured to close off at an intermediate position without connecting to a respective one of the first and second outside circumferential grooves, and the fourth sipe being configured to connect between the respective one of the first and second outside circumferential grooves and the closed off end of the shoulder lug groove.

17. The pneumatic tire according to claim 16, wherein the shoulder lug slants diagonally toward the second side of the pneumatic tire toward which the second groove section slants with respect to the circumferential direction of the pneumatic tire.

18. The pneumatic tire according to claim 16, wherein each of the shoulder land sections includes fifth sipes, each of the fifth sipes comprising first sipe elements and a second sipe element, the first sipe elements being arranged to sandwich one of the shoulder lug grooves along the circumferential direction of the pneumatic tire and to extend from the respective one of the outside circumferential grooves in a widthwise outwardly direction of the pneumatic tire, and the second sipe element being arranged to extend along the circumferential direction of the pneumatic tire to connect to the first sipe elements and cut across a position corresponding to a shoulder-side end portion where the shoulder lug groove ends on a widthwise outward side of the pneumatic tire.

\* \* \* \* \*